Nov. 12, 1957
A. HAR'EL
2,813,238
MOTOR CONTROL CIRCUIT
Filed March 28, 1955
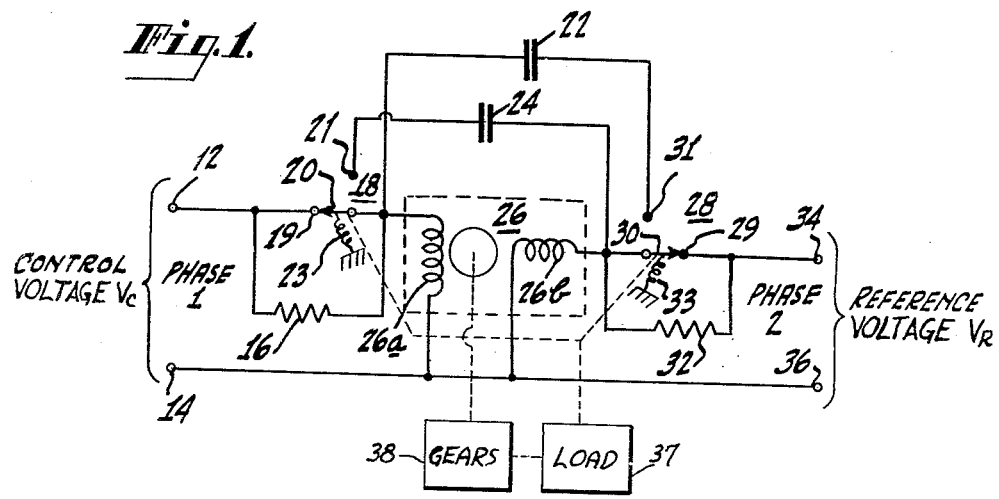
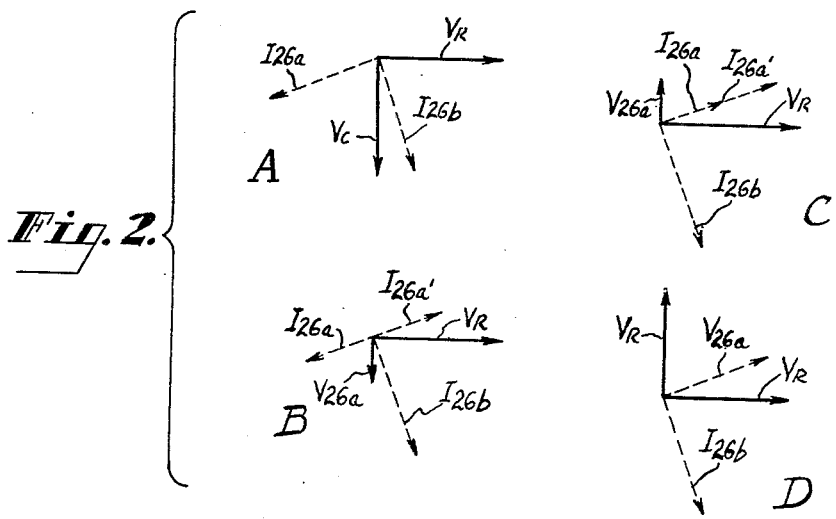
INVENTOR.
ABRAHAM HAR'EL
BY
ATTORNEY

2,813,238
MOTOR CONTROL CIRCUIT

Abraham Har'el, Philadelphia, Pa., assignor to Radio Corporation of America, a corporation of Delaware Application March 28, 1955, Serial No. 497,170

15 Claims. (Cl. 318—207)

This invention relates to an improved motor control circuit and, more particularly, to a circuit for stopping the rotation of a load driven by a motor at a given position and maintaining it at that position until the sense of a control voltage which drives the motor has been reversed.

It is often desired in various applications to limit the extent of rotation of a load driven by a motor to within predetermined limits. For example, in controlling the opening and closing of the iris diaphragm in a television camera, the maximum rotation of the iris adjustment is limited to about 90°. If the motor that rotates the iris is not stopped at the limits of the iris adjustment, the lens and iris mechanism, or the motor gears and driving system, or both, may be damaged.

Sector scanning by a radar antenna also may require that the rotation of the antenna be controlled within predetermined limits.

An object of this invention is to provide improved means for halting the rotation of a motor when the load driven by the motor reaches a limit position.

Another object of the present invention is to provide an improved motor control circuit which stops the load driven by a motor at a limit position and, when the sense of the voltage driving the motor changes, drives the motor away from the limit.

This invention is applicable to the control of a polyphase motor such as a two-phase motor. When employed with a two-phase motor, a reference voltage is applied across one of the motor field windings and a control voltage substantially 90° out of phase with the reference voltage to the other motor field winding. These induce currents in the two windings which are substantially 90° out of phase with one another, whereby the motor rotates in a given direction. The direction of rotation may be reversed by reversing the phase of the control voltage.

According to the invention, when the load driven by the motor reaches a limit position, the voltage applied to one phase winding of the motor is reduced in amplitude, whereby the current through that winding is also reduced in amplitude. A second current substantially opposed in phase to the reduced current is also applied to that phase winding. The resultant current through that winding is thereby reduced to a value below that sufficient to drive the motor and its rotation is stopped. Preferably the two currents are of approximately the same amplitude. The second current may be derived from the voltage applied across the other winding of the two-phase motor.

The motor remains halted until the sense of the control voltage is reversed. This action also reverses the sense of the current induced by the control voltage. This induced current is now in phase with the reduced current through the aforementioned winding. The combined currents are of sufficient amplitude to start the motor rotating in the opposite direction.

The invention will be described in greater detail with reference to the accompanying drawing in which similar reference characters apply to similar elements, and in which:

Figure 1 is a schematic circuit diagram of a preferred embodiment of the invention; and Figures 2A–D are a series of vector diagrams helpful in understanding the operation of the invention.

Referring to Figure 1, an alternating-current reference signal of constant amplitude, for example, a line voltage of 110 volts at 60 cycles per second, hereinafter termed "phase 2," is applied to one field winding 26b of a two-phase motor 26. In the position of the single-pole, double-throw limit switch 28 shown, the power circuit includes the switch arm 30 and the contact 29. A resistor 32 is bridged across contact 29 and the switch arm 30.

A control voltage, hereinafter termed "phase 1," of the same frequency but 90° out of phase with the reference voltage, is applied to the other field winding 26a, of the motor 26 through the contact 19 and the switch arm 20 of another single-pole, double-throw limit switch 18. Resistor 16 is bridged across contact 19 and contact arm 20. A capacitor 24 is connected from the second contact 21 of phase 1 limit switch 18 to the junction between the contact arm 30 of the phase 2 limit switch 28 and the phase 2 winding 26b of the motor 26. Similarly, a capacitor 22 is connected from the second contact 31 of the phase 2 limit switch 28 to the junction between the contact arm 20 of the phase 1 limit switch 18 and the phase 1 winding 26a of the motor 26.

The motor drives a load 37, such as the iris diaphragm of a television camera or the like, either directly or through gears 38, as shown. The phase 1 limit switch 18 is operated when the motor 26 has rotated its load 37 to a predetermined position in one direction, for example, counterclockwise, and the phase 2 limit switch 28 is operated when the motor 26 has rotated its load to a predetermined position in the opposite direction. Actuation of the switches may be accomplished by means of cams on the rotating shaft of the motor 26, or on a shaft driving or driven by the load, as shown, or any other form of mechanical connection between a driven shaft and the respective switches. Since such means are conventional no further description is necessary. When a limit switch, e. g. 18, is actuated, the contact arm 20 moves from contact 19 to contact 21 and when the motor 26 reverses direction and removes the cam pressure on the contact arm 20, the arm 20 is returned to contact 19 by spring bias means 23. A similar action occurs with respect to the other limit switch 28.

The polarity of the control voltage is reversible to control the direction of rotation of the motor 26. The amplitude of the control voltage may vary, assuming any value between zero volts and $V_{max}$ volts (for example $V_{max}$ may be equal to the amplitude of the line voltage, feeding phase 2). The motor 26 ceases to rotate when the control voltage applied to the field winding 26a decreases to less than a certain value, $V_1$, for example, 10 volts, and starts again, after being halted, when the control voltage increases to more than another value, $V_2$, for example, 15 volts. Actuation of a limit switch, for example, the phase 1 limit switch 18, places the resistor 16 in series with field winding 26a thereby reducing the voltage across winding 26a to a value less than $V_1$, e. g., 9 volts, that is, a value less than that required to rotate the motor. At the same time, the by-pass circuit including capacitor 24 is connected to the power circuit of field winding 26b and to field winding 26a, thereby applying a fraction of the reference voltage to winding 26a. The value of the capacitor 24 is such that the amplitude of the reference voltage applied to the phase 1 winding 26a is approximately equal to the amplitude of the reduced control voltage. The current passing through capacitor 24 which is applied to winding 26a leads the reference voltage. This current is substantially 180 degrees out of phase with the current induced in winding 26a by the control voltage.

The vector diagrams of Figure 2 show, in somewhat idealized form, the current and voltage relationships at the field windings of motor 26. In the drawing, and in the explanation which follows, $V_C$ = control voltage
$V_R$ = reference voltage
$V_{26a}$ = the reduced control voltage component across field winding 26a when resistor 16 is in series with the winding
$V_{26b}$ = the reduced reference voltage component across field winding 26b when resistor 32 is in series with the winding
$I_{26a}$ = the current induced in winding 26a by the control voltage $V_C$
$I_{26a'}$ = the current induced in winding 26a by the reference voltage $V_R$
$I_{26b}$ = the current induced in the winding 26b by the reference voltage $V_R$
$I_{26b'}$ = the current induced in winding 26b by the control voltage $V_C$ The solid lines in Figure 2 represent voltages, the dashed lines currents. Figure 2A shows the voltage and current conditions when the switches are in the positions shown in Figure 1, and the motor is rotating counter-clockwise; Figure 2B shows the vector conditions at the time the load reaches its counter clockwise limit; Figure 2C shows the vector conditions when the sense of the control voltage is reversed and the load starts backing away from its counter clockwise limit; and Figure 2D shows the vector conditions when the switches return to the positions shown in Figure 1 and the motor is driving in a clockwise direction.

Referring to Figure 2A, when the limit switches 18 and 28 are in the position shown in Figure 1, the amplitudes of the reference and control voltages applied to the phase 2 winding 26b and to the phase 1 winding 26a, respectively, are approximately equal although the voltages are 90° out of phase. The current $I_{26b}$ induced in field winding 26b by the reference voltage $V_R$ is shown lagging the reference voltage by an angle somewhat less than 90°. The two vectors are not exactly 90° out of phase as the motor is under load. The current $I_{26a}$ induced in field winding 26a by the control voltage lags the control voltage by an angle of somewhat less than 90°. The current vectors $I_{26a}$ and $I_{26b}$ are substantially 90° out of phase and the motor 26 rotates in one direction, e. g., counter clockwise.

When the load driven by the motor reaches its counter-clockwise limit, phase 1 limit switch 18 is actuated and arm 20 engages contact 21. The portion of the control voltage applied to winding 26a ($V_{26a}$) is reduced in amplitude to a value lower than $V_1$ by the insertion of the resistor as is the current $I_{26a}$ it induces in winding 26a. At the same the by-pass circuit including capacitor 24 applies a reduced reference current $I_{26a'}$ to the field winding 26a. This is shown in Figure 2B. The reduced current $I_{26a'}$ induced in winding 26a by the reference voltage is approximately equal in amplitude to the reduced current $I_{26a}$ induced in winding 26a by the control voltage but is 180° out of phase therewith. This is due to capacitor 24 which shifts the phase of the current induced by the reference voltage by 90°. The vectorial sum of the two currents induced in windings 26a is very small—substantially less than that required to rotate the motor, and the motor stops immediately.

No subsequent rotation occurs until the polarity of the control voltage is reversed (Figure 2C). Limit switch 18 is still actuated and arm 20 is engaged with contact 21. Now the current $I_{26a'}$ applied via the by-pass circuit including capacitor 24 is in phase with and adds to the reduced control current $I_{26a}$. When the sum of the reduced control current $I_{26a}$ and the by-pass current $I_{26a'}$ is greater than the value required to start the rotation of the motor 26, the latter rotates in the clockwise direction, and the phase 1 limit switch 18 is released. The spring bias 23 returns the switch to its normal position (arm 20 in contact with terminal 19) and the full control voltage $V_R$ is applied to the phase 1 winding 26a (Figure 4D). The motor 26 continues to rotate until the control voltage $V_R$ is removed, or until the phase 2 limit switch 28 is actuated. In the latter case, resistor 32 is placed in series with winding 26b and the portion of the reference voltage applied to the phase 2 winding 26b is reduced. Simultaneously the reduced control voltage, induces a current $I_{26b'}$ in winding 26b via the by-pass circuit including condenser 22. The currents induced by the two voltages are substantially 180° out of phase and of substantially equal amplitudes, whereby the rotation of the motor stops.

It is to be noted that the amplitudes of the control and reference voltages need not be equal. Furthermore, the amplitudes of the reduced control and reference currents need not necessarily be equal, although this is preferred since the motor rotation is thereby halted more quickly. Whether the reduced currents are equal or not, their vector difference must be a value below that necessary to maintain rotation and their vector sum must be a value sufficient to start motor rotation.

A typical embodiment of the circuit of Figure 1 includes circuit components as follows:

Resistors 16 and 32_____ohms__ 2200
Capacitors 22 and 24_____microfarads__ .2

What is claimed is:

1. In a motor control system for a two-phase motor of the type which rotates in one direction when a reference voltage is applied to one of its field windings and a control voltage 90° out of phase in one sense with said reference voltage is applied to the other of its field windings and which rotates in an opposite direction when said control voltage is applied to said other winding 90° out of phase in an opposite sense with said reference voltage, and which stops rotating when the current through one of said field windings drops below a predetermined amplitude, an arrangement for stopping said motor at a limit position comprising, in combination, first control means actuated by said motor when it attains a limit position for reducing one of said applied voltages to a given amplitude, whereby the current induced by said voltage is reduced in amplitude, and combining a current derived from the other of said applied voltages with said induced current substantially 180° out of phase therewith, the amplitude of said derived current relative to said induced current being such that the sum of the two out-of-phase currents is less than said predetermined amplitude.

2. In a motor control system as set forth in claim 1, further including second means actuated by said motor when it reaches a limit position in the opposite direction for stopping motor rotation in said opposite direction, said second means being substantially identical with said first control means.

3. An arrangement as set forth in claim 1, wherein said first control means includes: single-pole, double-throw switch on one contact of which one of said applied voltages is impressed, and having a switch arm connected to one said field winding; a resistor bridging said one contact and said switch arm; and a capacitor, on one terminal of which said other of said applied voltages is impressed, the other terminal being connected to the second of the contacts of said limit switch, said switch arm being actuated when said motor rotates to said limit position to break connection with said one contact thereby inserting said resistor in effective electrical circuit between said one contact and said one field winding, and to make connection with said second contact thereby electrically connecting said capacitor through said second contact to said one field winding.

4. A method for stopping a polyphase motor of the type which rotates in one direction when the currents passing through its field windings are at least a given angle out-of-phase in one sense with one another, and which rotates in the opposite direction when the currents passing through said field windings are at least a given angle out-of-phase in an opposite sense with one another, and which stops rotating when the current through one of its windings drops below a predetermined level, comprising the steps of reducing the current through said one winding; and combining with the reduced current an out-of-phase current of sufficient amplitude that the vector sum of the combined currents is less than said predetermined level.

5. A method for stopping a polyphase motor of the type which rotates in one direction when the voltages applied across its field windings are at least a given angle out-of-phase in one sense with one another, and which rotates in the opposite direction when the voltages applied across said field windings are at least a given angle out-of-phase in an opposite sense with one another, and which stops rotating when the current induced in one of its windings by an applied voltage drops below a predetermined level, comprising the steps of reducing the current through said one winding; deriving from the voltage applied to another winding a second current having an amplitude close to that of said reduced current; and applying the second current to said one winding substantially out-of-phase with said reduced current.

6. A method for stopping and then starting a polyphase motor of the type which rotates in one direction when the currents passing through its field windings are at least a given angle out-of-phase in one sense with one another, and which rotates in the opposite direction when the currents passing through said field windings are at least a given angle out-of-phase in an opposite sense with one another, and which stops rotating when the current through one of its windings drops below a predetermined level, and which starts rotating again when the current through said winding exceeds another level, comprising the steps of reducing the current through said one winding; combining with the reduced current an out-of-phase current of sufficient amplitude that the vector sum of the combined currents is less than said predetermined level, whereby the rotation of the motor stops; removing the out-of-phase current; then combining with the reduced current an in-phase current of sufficient amplitude that the vector sum of the combined currents is greater than said other level.

7. A method for stopping and then starting a polyphase motor of the type which rotates in one direction when the voltages applied across its field windings are at least a given angle out-of-phase in one sense with one another, and which rotates in the opposite direction when the voltages applied across its field windings are at least a given angle out-of-phase in an opposite sense with one another, and which stops rotating when the current induced in one of its windings by the voltage applied to that winding drops below a predetermined level, and which starts rotating again when the current through said winding exceeds another level, comprising the steps of reducing the current through said one winding; deriving from the voltage applied to another winding a second current having an amplitude close to that of said reduced current; applying the second current to said one winding substantially out-of-phase with said reduced current to obtain a resultant current of an amplitude substantially less than said predetermined level, whereby the rotation of the motor stops; then reversing the phase of said second current to obtain a resultant current through said one winding of an amplitude greater than said other level.

8. A control system for a polyphase motor of the type which rotates in one direction when the currents passing through its field windings are at least a given angle out-of-phase in one sense with one another, and which rotates in the opposite direction when the currents passing through said field windings are at least a given angle out-of-phase in an opposite sense with one another, and which stops rotating when the current through one of its windings drops below a predetermined level, comprising, in combination, means for reducing the current through said one winding; and means for combining with the reduced current an out-of-phase current of sufficient amplitude that the vector sum of the combined currents is less than said predetermined level.

9. A control system for a two-phase motor of the type which rotates in one direction when the currents passing through its two field windings are approximately 90° out-of-phase in one sense with one another, and which rotates in the opposite direction when the currents passing through said field windings are approximately 90° out-of-phase in an opposite sense with one another, and which stops rotating when the current through one of its windings drops below a predetermined level, comprising, in combination, means for reducing the current through said one winding; and means for combining with the reduced current an out-of-phase current of sufficient amplitude that the vector sum of the combined currents is less than said predetermined level.

10. A control system for a polyphase motor of the type which rotates in one direction when the voltages applied across its field windings are at least a given angle out-of-phase in one sense with one another, and which rotates in the opposite direction when the voltages applied across said field windings are at least a given angle out-of-phase in an opposite sense with one another, and which stops rotating when the current induced in one of its windings by an applied voltage drops below a predetermined level, comprising, in combination, impedance means; means for connecting said impedance means in series with said one winding for reducing the current induced in said one winding; phase shifting means; and means for connecting said phase-shifting means between said one winding and another of said field windings for inducing in said one winding a current which is substantially out-of-phase with said reduced current and of sufficient amplitude that the vector sum of the two currents is less than said predetermined level.

11. A control system as set forth in claim 10, wherein said impedance means comprises a resistor.

12. A control system as set forth in claim 11, wherein said phase-shifting means comprises a capacitor.

13. A system for stopping the rotation of a two-phase motor of the type which rotates in one direction when the voltages applied across its two field windings are substantially 90° out-of-phase in one sense with one another, and which rotates in the opposite direction when the voltages applied across its windings are substantially 90° out-of-phase in an opposite sense with one another, and which stops rotating when the current induced in one of its windings by an applied voltage drops below a predetermined level, when the load driven by the motor reaches a limit position, comprising, in combination, impedance means; switch means operatively associated with said motor and actuated when the load driven by the motor reaches a limit position for connecting said impedance means in series with said one winding for reducing the current induced in said one winding; and phase-shifting means responsive to said switch means for deriving from the voltage applied across the other of said windings a current which is substantially 180° out-of-phase with said reduced current and of sufficient amplitude that the vector sum of the reduced current and the second current is less than said predetermined level, and applying said reduced current to said one winding.

14. A control system for a polyphase motor of the type which rotates in one direction when the voltages applied across its field windings are at least a given angle out-of-phase in one sense with one another, and which rotates in the opposite direction when the voltages applied across said field windings are at least a given angle out-of-phase in an opposite sense with one another, and which stops rotating when the current induced in one of its windings by an applied voltage drops below a predetermined level, comprising, in combination, means for deriving from the voltages applied across another of said windings a second current and applying said second current to said one winding substantially out-of-phase with the current in said one winding.

15. A control system as set forth in claim 13, wherein said impedance means comprises a resistor.

No references cited.